(12) United States Patent
Matsui et al.

(10) Patent No.: US 11,022,208 B2
(45) Date of Patent: Jun. 1, 2021

(54) DRIVE-FORCE TRANSMITTING APPARATUS FOR VEHICLE

(71) Applicant: TOYOTA JIDOSHA KABUSHIKI KAISHA, Toyota (JP)

(72) Inventors: Masanori Matsui, Toyota (JP); Shinichi Baba, Toyota (JP); Shinichiro Suenaga, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/900,171

(22) Filed: Jun. 12, 2020

(65) Prior Publication Data

US 2020/0393039 A1 Dec. 17, 2020

(30) Foreign Application Priority Data

Jun. 12, 2019 (JP) .............................. JP2019-109915

(51) Int. Cl.
*F16H 57/04* (2010.01)
*F16H 57/03* (2012.01)
*F16H 57/02* (2012.01)

(52) U.S. Cl.
CPC ......... *F16H 57/0424* (2013.01); *F16H 57/03* (2013.01); *F16H 57/045* (2013.01); *F16H 57/0436* (2013.01); *F16H 57/0441* (2013.01); *F16H 57/0471* (2013.01); *F16H 2057/02052* (2013.01)

(58) Field of Classification Search
CPC ..... F16H 57/0424; F16H 57/03; F16H 57/045
See application file for complete search history.

(56) References Cited

U.S. PATENT DOCUMENTS

2013/0283972 A1* 10/2013 Yamamoto .......... F16H 57/0486
74/665 B

FOREIGN PATENT DOCUMENTS

JP 2017-047732 A 3/2017

* cited by examiner

*Primary Examiner* — Derek D Knight
(74) *Attorney, Agent, or Firm* — Hunton Andrews Kurth LLP

(57) ABSTRACT

A vehicle drive-force transmitting apparatus including: a casing provided with an oil supply hole through which an oil is to be supplied to a lubrication-required element. The casing is provided with a first guide portion and a second guide portion. The first guide portion defines a first path that is configured to guide the oil to flow from a diagonally upper side of the oil supply hole, toward the oil supply hole. The second guide portion defines a second path that is configured to separate the oil flowing along the first path, into a part of the oil and another part of the oil in an intermediate portion of the first path and to cause the part of the oil to join with the another part the oil in a position located right above the oil supply hole.

8 Claims, 5 Drawing Sheets

DRIVE-FORCE TRANSMITTING APPARATUS FOR VEHICLE

This application claims priority from Japanese Patent Application No. 2019-109915 filed on Jun. 12, 2019, the disclosure of which is herein incorporated by reference in its entirety.

FIELD OF THE INVENTION

The present invention relates to a drive-force transmitting apparatus for a vehicle, particularly, to techniques for solving insufficiency of oil supply.

BACKGROUND OF THE INVENTION

JP-2017-47732 A discloses a drive-force transmitting apparatus in which an oil supply hole 41a is provided in a bearing support portion 41 of a case 11, such that an oil is to be supplied through the oil supply hole 41a to, for example, a bearing 31 that is to be lubricated. Further, this Japanese Patent Application Publication teaches that the case 11 is provided with an oil guide portion 7 for guiding the oil to the oil supply hole 41a.

SUMMARY OF THE INVENTION

By the way, in an arrangement in which the oil guide portion is provided to define a path configured to guide the oil to flow toward the oil supply hole from a diagonally upper side of the oil supply hole, when a flow velocity of the oil flowing along the path is increased, the oil is likely to flow to a position deviated from the oil supply hole, whereby an amount or rate of flow of the oil introduced into the oil supply hole could be smaller than a required amount or rate, so that there is a risk of lubrication insufficiency.

The present invention was made in view of the background art described above. It is therefore an object of the present invention to provide a drive-force transmitting apparatus for a vehicle, wherein the apparatus is capable of introducing a required amount of oil into the oil supply hole even when the flow velocity of the oil flowing along the oil guide portion is high.

The above object is achieved according to the following aspects of the present invention.

According to a first aspect of the invention, there is provided a drive-force transmitting apparatus for a vehicle, which comprises: a casing provided with an oil supply hole through which an oil is to be supplied to a lubrication-required element, wherein the casing is provided with a first guide portion and a second guide portion, wherein the first guide portion defines a first path that is configured to guide the oil to flow from a diagonally upper side of the oil supply hole, toward the oil supply hole, and wherein the second guide portion defines a second path that is configured to divide or separate the oil flowing along the first path, into a part of the oil and another part of the oil in an intermediate portion of the first path and to cause the part of the oil to join with the another part the oil in a position located right above the oil supply hole. For example, the first guide portion is constituted by at least a first rib which extends from an inside wall surface of the casing, while the second guide portion is constituted by at least a separating rib which extends from the inside wall surface of the casing, wherein the first rib is located on an upper side of the oil supply hole and on one of opposite sides, in a horizontal direction of the drive-force transmitting apparatus, of the oil supply hole, wherein the first rib has a guide surface which faces generally toward the other of the opposite sides of the oil supply hole and which is inclined toward the other of the opposite sides of the oil supply hole in a downward direction of the drive-force transmitting apparatus, such that the oil is to be guided to flow along the guide surface from the diagonally upper side of the oil supply hole toward the oil supply hole, and wherein the separating rib is adjacent to the first rib in the horizontal direction and is located on the upper side of the oil supply hole, the separating rib having an upper end surface that intersects with the guide surface of the first rib in a position corresponding to the intermediate portion of the first path in which the oil flowing along the first path is to be separated into the part of the oil and the another part of the oil. Further, for example, the upper end surface of the separating rib is inclined upwardly in a direction which is parallel to the horizontal direction and which is away from the guide surface of the first rib. Still further, for example, the mechanical oil pump is configured to pump out the oil stored in an oil storage that is constituted by a lower portion within the casing, wherein the drive-force transmitting apparatus further comprises a rotary member that is at least partially immersed in the oil stored in the oil storage, and wherein the lubrication-required element is a bearing by which the rotary member is rotatably supported.

According to a second aspect of the invention, the drive-force transmitting apparatus according to the first aspect of the invention further comprises: a rotary member that is to be rotated together with drive wheels of the vehicle; and a mechanical oil pump that is to be driven by the rotary member to discharge the oil that is to be guided to flow from the diagonally upper side of the oil supply hole toward the oil supply hole.

According to a third aspect of the invention, in the drive-force transmitting apparatus according to the first or second aspect of the invention, the lubrication-required element is a bearing fitted in an inner peripheral portion of a cylindrical tubular member that is provided with the oil supply hole.

In the drive-force transmitting apparatus according to the first aspect of the invention, the oil flowing along the first path is separated, by the second guide portion defining the second path, into the part of the oil and the another part of the oil in the intermediate portion of the first path whereby a flow velocity of the oil is reduced. Further, the part of the oil flowing along the second path and the another part of the oil flowing the first path are caused to join with each other in the position located right above the oil supply hole, so that the two parts of the oil are caused to collide with each other, whereby each of directions of flows of the two parts of the oil is changed to a direction toward the oil supply hole. Thus, the oil into which the two parts of the oil have been integrated is introduced into the oil supply hole. Owing to this arrangement, even when the flow velocity is high, it is possible to reduce the oil flowing to a position deviated from the oil supply hole, thereby making it possible to restrain an amount of the oil introduced into the oil supply hole, from being smaller than a required amount.

In the drive-force transmitting apparatus according to the second aspect of the invention, the mechanical oil pump is to be driven by the rotary member that is to be rotated together with the drive wheels of the vehicle, and the oil discharged from the mechanical oil pump is supplied toward the oil supply hole from the diagonally upper side of the oil supply hole, so that the flow velocity of the oil discharged from the oil pump is increased in proportion with increase of a running speed of the vehicle. However, owing to provision of the second guide portion, the oil can be introduced efficiently into the oil supply hole even when the flow velocity of the oil discharged from the oil pump is increased.

In the drive-force transmitting apparatus according to the third aspect of the invention, the oil flowing into the oil supply hole is supplied to the bearing fitted in the inner peripheral portion of the cylindrical tubular member, whereby the bearing can be effectively lubricated.

DETAILED DESCRIPTION OF PREFERRED EMBODIMENT

Hereinafter, a preferred embodiment of the invention will be described in detail with reference to the accompanying drawings. The figures of the drawings are simplified or deformed as needed, and each portion is not necessarily precisely depicted in terms of dimension ratio, shape, etc.

Embodiment

Figure 1:
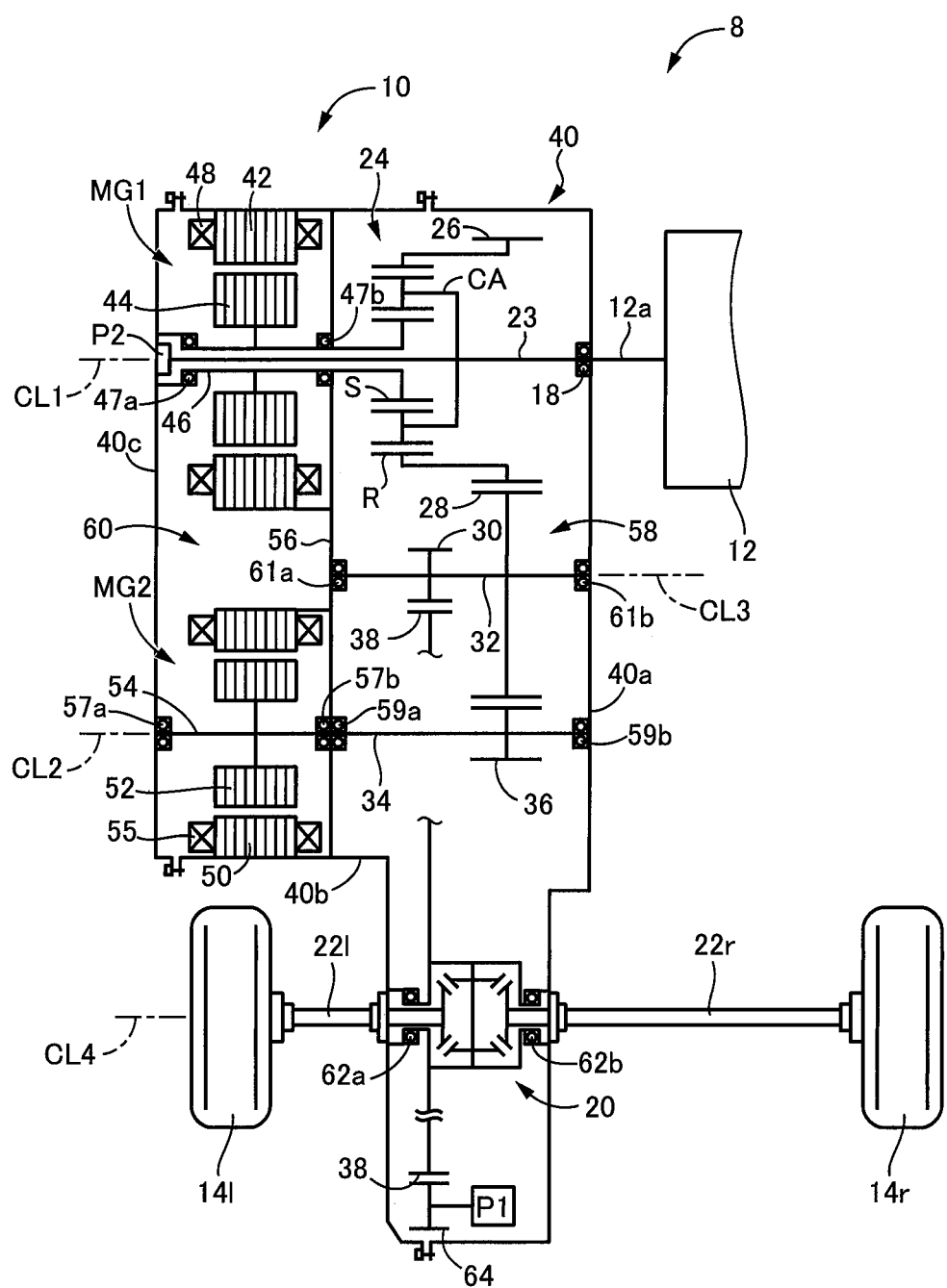
FIG. 1 is a view schematically showing, by way of example, construction of a hybrid vehicle to which the present invention is applied.

FIG. 1 is a view schematically showing, by way of example, construction of a hybrid vehicle 8 to which the present invention is applied. The vehicle 8 includes an engine 12, right and left drive wheels 14r, 14l (hereinafter simply referred to as "drive wheels 14" unless they are to be distinguished from each other) and a drive-force transmitting apparatus 10. The drive-force transmitting apparatus 10 is to be used advantageously in a hybrid vehicle of FF (front engine/front drive) system. The drive-force transmitting apparatus 10 is a drive-force transmitting apparatus of hybrid type, which is to be disposed between the engine 12 and drive wheels 14 of the vehicle 8, so as to transmit a drive force outputted from the engine 12 as a drive-force source and a drive force outputted from a second electric motor MG2 as another drive-force source, to the right and left drive wheels 14r, 14l, via, for example, a differential device 20 and right and left axles 22r, 22l (hereinafter simply referred to as "axles 22" unless they are to be distinguished from each other).

As shown in FIG. 1, the drive-force transmitting apparatus 10 includes the above-described differential device 20, the above-described axles 22, an input shaft 23, a planetary gear device 24, an output gear 26, a counter gear 28, a differential drive gear 30, a counter shaft 32, a drive-force transmitting shaft 34, a reduction gear 36, a first electric motor MG1 and the above-described second electric motor MG2. The input shaft 23 is disposed to be rotatable about a first axis CL1. The planetary gear device 24, first electric motor MG1 and output gear 26 are disposed to be coaxial with the input shaft 23 and are located radially outside the input shaft 23. The drive-force transmitting shaft 34 is disposed to be rotatable about a second axis CL2. The second electric motor MG2 is disposed to be coaxial with the drive-force transmitting shaft 34 so as to be rotatable about the second axis CL2. The reduction gear 36 is disposed on the drive-force transmitting shaft 34. The counter shaft 32 is disposed to be rotatable about a third axis CL3. The counter gear 28 and differential drive gear 30 are disposed on the counter shaft 32. The differential device 20 and the axles 22 are disposed to be rotatable about a fourth axis CL4. All of these rotary members are disposed within a casing 40 as a non-rotary member. The drive-force transmitting apparatus 10 further includes a parking lock mechanism 37 configured to stop rotation of the output gear 26. It is noted that all of the first through fourth axes CL1-CL4 are rotary axes that are parallel to a width direction of the vehicle 8.

Each of the first and second electric motors MG1, MG2 may be an electric motor having a function of a motor operable to convert an electric energy into a mechanical drive force and/or a function of a generator operable to convert a mechanical drive force into an electric energy, and preferably, is a motor generator having both of the functions so as to be operated as a selected one of the motor and the generator. In the present embodiment, the first electric motor MG1 has a function of an electric generator operable to receive a reaction force from the engine 12, and a function of an electric motor operable to start the engine 12 while the engine 12 is at rest. Meanwhile, the second electric motor MG2 has a function of an electric motor functioning as a vehicle drive power source to generate a vehicle driving force, and a function of an electric generator operable to perform a regenerative operation for converting a reverse driving force received from the drive wheels 14, into an electric energy. It is noted that the term "drive force" used in the present specification is synonymous with a drive torque or a drive power.

The input shaft 23 is connected to the engine 12 through members such as a crank shaft 12a and a damper (not shown), in a drive-force transmittable manner. The input shaft 23 is held, through members such as a bearing 18, by the casing 40 as the non-rotary member, such that the input shaft 23 is rotatable about the first axis CL1.

The planetary gear device 24, which is disposed to be coaxial with the first axis CL1, is a single-pinion type planetary gear device (differential mechanism) that includes a sun gear S, a carrier CA and a ring gear R. The planetary gear device 24 serves as a drive-force distributing mechanism configured to distribute the drive force of the engine 12 to the first electric motor MG1 and the output gear 26. The sun gear S of the planetary gear device 24 is connected to the first electric motor MG1 in a drive-force transmittable manner. The carrier CA of the planetary gear device 24 is connected to the engine 12 through the input shaft 23 and the crank shaft 12a in a drive-force transmittable manner. The ring gear R of the planetary gear device 24 is connected to the output gear 26 in a drive-force transmittable manner. It is noted that the ring gear R and the output gear 26 are formed integrally with each other, namely, are constituted by a compound gear.

The first electric motor MG1 is disposed in a position adjacent to the planetary gear device 24, with a partition wall 56 (that is a part of the casing 40) being located between the first electric motor MG1 and the planetary gear device 24 in a direction of the first axis CL1. The first electric motor MG1 includes an annular-shaped stator 42 that is unrotatably fixed to the causing 40, an annular-shaped rotor 44 disposed on an inner peripheral side of the stator 42, and a rotor shaft 46 connected to an inner periphery of the rotor 44. The stator 42 is provided with a stator coil 48 wound thereon. The rotor shaft 46 is held at its axially opposite end portions by the casing 40 through a pair of bearings 47a, 47b, such that the rotor shaft 46 is rotatable about the first axis CL1.

The output gear 26 is connected to the ring gear R of the planetary gear device 24, and meshes with the counter gear 28 that is disposed on the counter shaft 32.

The second electric motor MG2 and the reduction gear 36 are disposed to be rotatable about the second axis CL2, with the partition wall 56 being located between the second electric motor MG2 and the reduction gear 36 in a direction of the second axis CL2.

The second electric motor MG2 includes an annular-shaped stator 50 that is unrotatably fixed to the causing 40, an annular-shaped rotor 52 disposed on an inner peripheral side of the stator 50, and a rotor shaft 54 connected to an inner periphery of the rotor 52. The stator 50 is provided with a stator coil 55 wound thereon. The rotor shaft 54 is held at its axially opposite end portions by the casing 40 through a pair of bearings 57a, 57b, such that the rotor shaft 54 is rotatable about the second axis CL2.

The reduction gear 36 is formed integrally with the drive-force transmitting shaft 34, and meshes with the counter gear 28 disposed on the counter shaft 32. The number of teeth of the reduction gear 36 is smaller than the number of teeth of the counter gear 28. Thus, rotation of the second electric motor MG2 is transmitted to the counter shaft 32 through the reduction gear 36 and the counter gear 28, such that a rotational speed of the counter shaft 32 is made lower than a rotational speed of the second electric motor MG2. The drive-force transmitting shaft 34 is held at its axially opposite end portions by the casing 40 through a pair of bearings 59a, 59b, such that the drive-force transmitting shaft 34 is rotatable about the second axis CL2.

The counter shaft 32 is held at its axially opposite end portions by the casing 40 through a pair of bearings 61a, 61b, such that the counter shaft 32 is rotatable about the third axis CL3.

The counter gear 28 and the differential drive gear 30 are disposed on the counter shaft 32, unrotatably relative to the counter shaft 32 that is to be rotated about the third axis CL3. The counter gear 28 meshes with the output gear 26 and the reduction gear 36 so that the drive force outputted from the engine 12 and/or the drive force outputted from the second electric motor MG2 are to be transmitted. The differential drive gear 30 meshes with a differential ring gear 38 of the differential device 20. Thus, when the drive force drive force outputted from the engine 12 and/or the drive force outputted from the second electric motor MG2 are transmitted to the counter gear 28 through the output gear 26 and/or the reduction gear 36, the drive force or forces are transmitted to the differential device 20 through the counter shaft 32 and the differential drive gear 30.

The differential device 20 and the pair of axles 22r, 22l are disposed to be rotatable about the fourth axis CL4. The differential ring gear 38 of the differential device 20 meshes with the differential drive gear 30 so that the drive force outputted from the engine 12 and/or the drive force outputted from the second electric motor MG2 are to be inputted to the differential device 20 through the differential ring gear 38.

The differential device 20 is constituted by a well-known differential mechanism, and is configured to transmit the drive force to the right and left axles 22r, 22l while allowing rotation of each of the axles 22r, 22l relative to the other of the axles 22r, 22l. It is noted that detailed description of the differential device 20, which is a known device, is not provided. The differential device 20 is held, at its opposite end portions that are opposite to each other in a direction of the fourth axis CL4, by the casing 40 through a pair of bearings 62a, 62b, such that the differential device 20 is rotatable about the fourth axis CL4.

The differential ring gear 38 of the differential device 20 meshes with a pump driving gear 64 that is provided to rotate or drive a differential-interlocking oil pump P1. The differential-interlocking oil pump P1 is a mechanical oil pump that is connected to the differential ring gear 38 of the differential device 20 through the pump driving gear 64 in a drive-force transmittable manner. When the differential ring gear 38 of the differential device 20 is rotated, the differential-interlocking oil pump P1 is mechanically rotated or driven together with rotation of the differential ring gear 38. That is, the differential ring gear 38 serves as a rotary drive source of the differential-interlocking oil pump P1. It is noted that the differential ring gear 38 and the differential-interlocking oil pump P1 correspond to "rotary member (that is to be rotated together with drive wheels)" and "mechanical oil pump", respectively, which are recited in the appended claims.

An oil is stored in an oil storage that is constituted by a lower portion within the casing 40. When the differential-interlocking oil pump P1 is rotated or driven, the oil stored in the oil storage is pumped out and is discharged from an outlet port (not shown) of the oil pump P1. The outlet port of the oil pump P1 is connected to a pipe 66 (see FIG. 4), so that the oil discharged from the outlet port of the oil pump P1 is pumped or delivered through the pipe 66.

The drive-force transmitting apparatus 10 includes, in addition to the differential-interlocking oil pump P1, another mechanical pump in the form of an engine-interlocking oil pump P2 that is be rotated or driven by the engine 12. The oil pump P2 is disposed on one of opposite end portions of the input shaft 23 which is remote from the engine 12 in an axial direction of the input shaft 23. The engine-interlocking oil pump P2 includes a drive gear (not shown) that is disposed on the above-described one of the opposite end portions of the input shaft 23, so that the engine-interlocking oil pump P2 is rotated or driven together with rotation of the engine 12. Therefore, with the engine 12 being rotated, the engine-interlocking oil pump P2 is driven whereby the oil is discharged from the engine-interlocking oil pump P2.

In the drive-force transmitting apparatus 10 constructed as described above, the drive force of the engine 12 is transmitted to the right and left drive wheels 14r, 14l through the planetary gear device 24, output gear 26, counter gear 28, counter shaft 32, differential drive gear 30, differential device 20 and axles 22r, 22l in this order of description. Further, the drive force of the second electric motor MG2 is transmitted to the right and left drive wheels 14r, 14l through the rotor shaft 54, drive-force transmitting shaft 34, reduction gear 36, counter gear 28, counter shaft 32, differential drive gear 30, differential device 20 and axles 22r, 22l in this order of description. It is noted that the term "drive force" used in the present specification is synonymous with a drive torque or a drive power.

The casing 40 is constituted by a housing 40a, an axle case 40b and a case cover 40c that are fixed to one another. The axle case 40b opens in its opposite ends that are opposite to each other in the direction of the first axis CL1. The axle case 40b is fixedly connected at one of the openings to the housing 40a through screw bolts, such that the one of the openings is enclosed by the housing 40a. The axle case 40b is fixedly connected at the other of the openings to the case cover 40c through screw bolts, such that the other of the openings is enclosed by the case cover 40c.

The axle case 40b is provided with the partition wall 56 that extends in a direction perpendicular to the first axis CL1. By the partition wall 56, an interior of the casing 40 is sectioned into a gear room 58 and a motor room 60, such that various gears or devices such as the planetary gear device 24, output gear 26, counter gear 28, reduction gear 36 and differential device 20 are disposed within the gear room 58 and such that the first and second electric motors MG1, MG2 are disposed within the motor room 60.

Hereinafter, there will be described lubrication of the bearing 62a that is disposed in the gear room 58 to rotatably support the differential device 20. It is noted that the bearing 62a corresponds to "lubrication-required element" that is recited in the appended claims.

Figure 2:
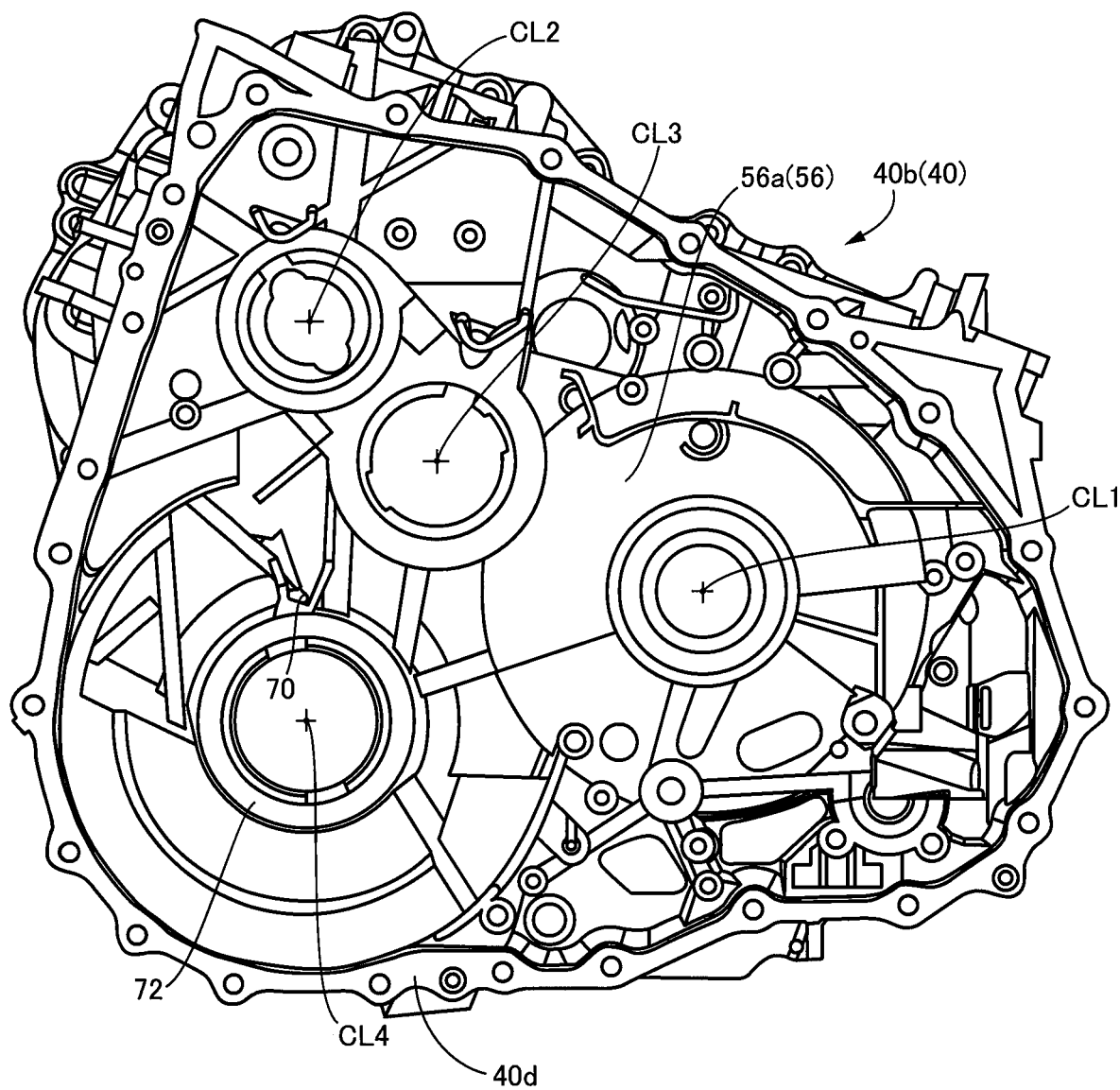
FIG. 2 is a view of an axle case shown in FIG. 1, as seen from a side of a gear room.

FIG. 2 is a view of the axle case 40b as seen from a side of the gear room 58. In the drawing sheet of FIG. 2, its leftward direction corresponds to a rear-side direction of the vehicle 8, while a rightward direction corresponds to a front-side direction of the vehicle 8. Further, in drawing sheet of FIG. 2, its upward direction corresponds to an upward direction perpendicular to a flat horizontal road surface in an apparatus installed state that is defined as a state in which the drive-force transmitting apparatus 10 is installed on the vehicle 8 and the vehicle 8 is on the flat horizontal road surface. The first through fourth axes CL1-CL4 shown in FIG. 1 correspond to respective rotational axes shown in FIG. 1.

In the casing 40, the oil stored in the oil storage that is constituted by the lower portion within the casing 40 is scooped up by the differential ring gear 38 (not shown in FIG. 2) that is at least partially immersed in the oil stored in the oil storage, whereby the oil is supplied to various gears and various bearings that are disposed within the gear room 58. It is noted that a vertical direction and a horizontal direction in the drawing sheet of FIG. 2 corresponds to a vertical direction and a horizontal direction of the drive-force transmitting apparatus 10, respectively, and that a lower portion of the casing 40 constitutes a bottom wall 40d of the casing 40 which defines the above-described oil storage.

Further, the axle case 40b is provided with a bearing support portion 72 which has a tubular cylindrical shape and which protrudes from a wall surface 56a of the partition wall 56 in a direction perpendicular to the wall surface 56a. The bearing support portion 72 has an oil supply hole 70 which opens in its outer circumferential surface and which passes through its circumferential wall, such that the oil is to be supplied through the oil supply hole 70 to the bearing 62a that supports the differential device 20. Since the oil supply hole 70 is held in communication with the bearing 62a, the bearing 62a can be lubricated by the oil that is introduced into the oil supply hole 70. It is noted that the bearing 62a is fitted in an inner peripheral portion of the bearing support portion 72 (see FIG. 5), so that the oil scooped up by the differential ring gear 38 is unlikely to easily reach the bearing 62a. Therefore, the bearing 62a is to be lubricated by the oil flowing into the oil supply hole 70. It is noted that the wall surface 56a of the partition wall 56 and the bearing support portion 72 correspond to "inside wall surface" and "cylindrical tubular member" that are recited in the appended claims.

Figure 3:
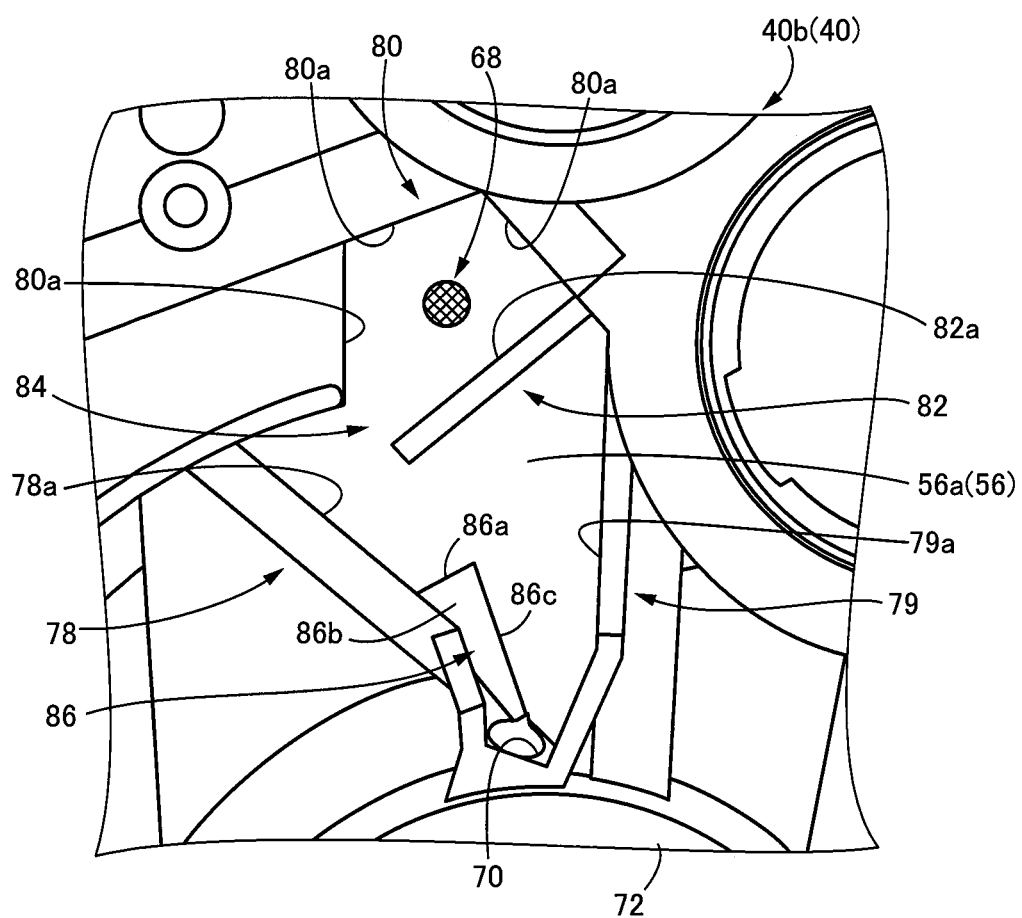
FIG. 3 is a view showing, in enlargement, an oil supply hole and its periphery shown in FIG. 2.

The oil supply hole 70 is configured to receive therein the oil discharged from the differential-interlocking oil pump P1 through the pipe 66. FIG. 3 is a view showing, in enlargement, the oil supply hole 70 and its periphery shown in FIG. 2.

In FIG. 3, a hatched part indicates an oil collision portion 68 with which the oil discharged from the pipe 66 is caused to collide. The oil collision portion 68 is a part of the wall surface 56a of the partition wall 56, and is located on a diagonally upper side (left upper side) of the oil supply hole 70. The pipe 66 has a distal end portion which is located in a position opposed to the oil collision portion 68, and which is substantially perpendicular to the wall surface 56a of the partition wall 56. Therefore, the oil discharged from the distal end portion of the pipe 66 is directed toward the wall surface 56a of the partition wall 56. The oil discharged from the distal end portion of the pipe 66 is caused to collide with the oil collision portion 68 of the wall surface 56a of the partition wall 56, and is then moved toward the oil supply hole 70 after having being caused to collide with the oil collision portion 68. It is noted that the oil discharged from the pipe 66 is not supplied directly to the oil supply hole 70 because there is a space limitation that does not allow the pipe 66 to extend down to the oil supply hole 70.

The oil collision portion 68 is located above the oil supply hole 70, so that the oil caused to collide with the oil collision portion 68 is moved downwardly toward the oil supply hole 70. The axle case 40b is provided with first and second ribs 78, 79 that extend from the wall surface 56a of the partition wall 56 in a perpendicular direction that is perpendicular to the wall surface 56a, i.e., in a direction in which the distal end portion of the pipe 66 is distant from the wall surface 56a, such that the oil caused to collide with the oil collision portion 68 that is located on the diagonally upper side of the oil supply hole 70, can be efficiently guided to the oil supply hole 70 by the first and second ribs 78, 79. The first and second ribs 78, 79 are located on a lower side of the oil collision portion 68, and are arranged in a V shape as seen in the perpendicular direction. The first and second ribs 78, 79 are formed integrally with the axle case 40b in a casting process. The first rib 78 is located on an upper side of the oil supply hole 70 and on one of opposite sides, in the horizontal direction of the drive-force transmitting apparatus 10, of the oil supply hole 70.

The first and second ribs 78, 79 are spaced apart from each other by a spacing distance that is increased in the upward direction of the drive-force transmitting apparatus 10, so as to cooperate with each other to receive the oil caused to collide with the oil collision portion 68 and to be dropped downwardly. The spacing distance between the first and second ribs 78, 79 is reduced in a downward direction of the drive-force transmitting apparatus 10, and the oil supply hole 70 is located in a position adjacent to lower ends of the first and second ribs 78, 79. That is, the oil supply hole 70 is located in the positioned between the lower ends of respective first and second ribs 78, 79. Thus, the oil caused to collide with the oil collision portion 68 is caused to flow along wall surfaces 78a, 79a of the respective first and second ribs 78, 79, and is guided by the wall surfaces 78a, 79a as guide surfaces, to the oil supply hole 70. The wall surface 78a of the first rib 78 faces generally toward the other of the above-described opposite sides of the oil supply hole 70, and is inclined toward the other of the opposite sides of the oil supply hole 70 in the downward direction, such that the oil is to be guided to flow along the wall surface 78a from the diagonally upper side of the oil supply hole 70 toward the oil supply hole 70.

By the way, the differential-interlocking oil pump P1 is driven by the differential ring gear 38 that is rotated together with the drive wheels 14, so that an amount or rate of the oil discharged from the oil pump P1 is increased with increase of a running speed V of the vehicle 8. Therefore, the oil in the pipe 66 is pressurized to a degree that is increased in proportional with the running speed V, and a flow velocity of the oil discharged from the pipe 66 is increased with increase of the pressurized degree of the oil in the pipe 66. When the flow velocity of the oil discharged from the pipe 66 is considerably increased, the oil flowing along the wall surface 78a of the first rib 78 could pass over the oil supply hole 70, so that there is a risk that an amount or rate of the oil introduced into the oil supply hole 70 could be smaller than a required amount or rate.

However, in the present embodiment, the oil collision portion 68 is surrounded by wall surfaces that are defined in the axle case 40b, for thereby reducing the flow velocity of the oil caused to collide with the oil collision portion 68. Specifically, the wall surface 56a is provided with a step 80 that extends perpendicularly to the partition wall 56 to surround the oil collision portion 68. Further, the wall surface 56a is provided with a block rib 82 that is located below the oil collision portion 68. The block rib 82 also extends perpendicularly to the partition wall 56 to surround the oil collision portion 68, so as to block flows of the oil splashing from the oil collision portion 68. The block rib 82 is formed integrally with the axle case 40b in a casting process.

The block rib 82 extends from the wall surface 56a of the partition wall 56 in the perpendicular direction. Further, as shown in FIG. 3 that is a view as seen in the perpendicular direction, the block rib 82, which cooperates with the step 80 to surround the oil collision portion 68, is inclined downwardly in the rear-side direction of the vehicle 8 that corresponds to the leftward direction in the drawing sheet of FIG. 3. The block rib 82 has a height substantially the same as a height of the step 80, wherein the height corresponds to a distance from the wall surface 56a of the partition wall 56 in the perpendicular direction. Thus, the oil collision portion 68 is surrounded by a wall surface 80a defined by the step 80 and a wall surface 82a of the block rib 82. It is noted that a gap or clearance 84 is provided in a position which is located below the oil collision portion 68 and which is located between the block rib 82 and the step 80, such that the oil caused to collide with the oil collision portion 68 is guided downwardly toward the oil supply hole 70.

The oil discharged from the pipe 66, is caused to collide with the oil collision portion 68, and then to splash to fly in various directions. However, the oil splashing to fly in the various directions is caused to collide with the wall surface 80a of the step 80 and the wall surface 82a of the block rib 82 that surround the oil collision portion 68. With the collision of the oil within a space around the oil collision portion 68, the flow velocity of the oil is reduced. Further, the oil caused to splash downwardly is caused to collide with the block rib 82, so as to be temporarily blocked within the space around the oil collision portion 68, whereby the collision of the oil is repeated within the space, so that the flow velocity of the oil is effectively reduced.

Figure 4:
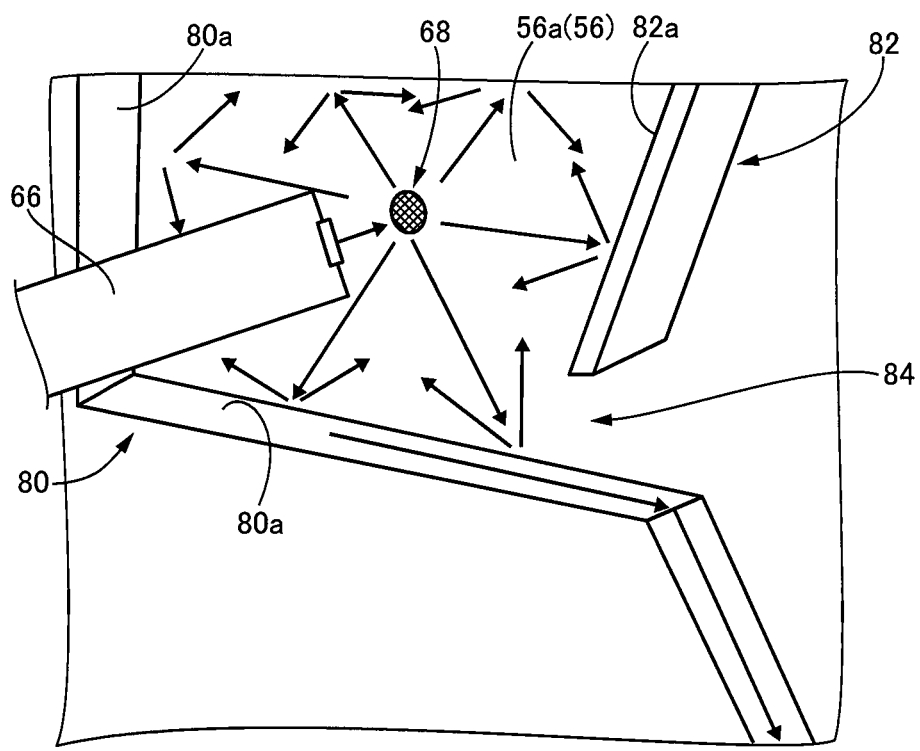
FIG. 4 is a view conceptually showing flows of an oil when the oil is discharged from a pipe toward a partition wall.

FIG. 4 is a view conceptually showing flows of the oil when the oil is discharged from the pipe 66 toward the oil collision portion 68 of the partition wall 56, wherein arrows represent directions of the respective flows of the oil. It is noted that the view of FIG. 4 is for the purpose of conceptually showing the flows of the oil, and that shapes and configurations shown in FIG. 4 do not precisely coincide with those shown in FIG. 3.

As shown in FIG. 4, the pipe 66 is arranged to extend in the above-described perpendicular direction toward the wall surface 56a of the partition wall 56 of the axle case 40b, so that the oil discharged from the distal end portion of the pipe 66 is directed to the oil collision portion 68 of the wall surface 56a of the partition wall 56. The oil caused to collide with the oil collision portion 68 splashes and flies in various directions surrounding the oil collision portion 68, as indicated by arrows in FIG. 4. Since the oil collision portion 68 is surrounded by the wall surface 80a of the step 80 and the wall surface 82a of the block rib 82, the splashing oil is temporarily blocked within the space surrounded by these surfaces 80a, 82a, and is caused to collide with these surfaces 80a, 82a, whereby the flow velocity of the oil is reduced. The oil whose flow velocity is reduced is moved downwardly through the clearance 84 that is defined between the step 80 and the block rib 82.

The block rib 82 has a shape and a size and is disposed in a position, wherein the shape, size and position are predetermined through experimentation or determined by an appropriate design theory, such that the oil flows down through the clearance 84 at a flow velocity that enables the oil to be introduced into the oil supply hole 70 without the oil passing over the oil supply hole 70. For example, where the shape, size and position of the block rib 82 are adjusted in a manner that widens the space which is around the oil collision portion 68 and which surrounded by cooperation of the step 80 and the block rib 82, it is possible to reduce the flow velocity of the oil discharged through the clearance 84. Thus, by taking account of this, the shape, size and position of the block rib 82 are adjusted such that the flow velocity of the oil discharged through the clearance 84 becomes an appropriate speed value.

Referring back to FIG. 3, the oil whose flow velocity is reduced within the above-describe space around the oil collision portion 68, is moved downwardly through the clearance 84 defined between the step 80 and the block rib 82, and then is moved further downwardly from a diagonally upper side (from an upper left side as seen in the drawing sheet) of the oil supply hole 70 along the wall surface 78a of the first rib 78. The oil moved downwardly along the wall surface 78a of the first rib 78 is guide by the first rib 78 to be introduced into the oil supply hole 70 that is located in the position adjacent to the lower end of the first rib 78.

In this instance, if the flow velocity of at least a part of the oil is not reduced to a speed value low enough in the space around the oil collision portion 68, the at least the part of the oil could flow in directions deviated from a direction toward the oil supply hole 70 so that there is a risk that the at least the part of the oil would pass over the oil supply hole 70. In the present embodiment, for the purpose of reducing the oil passing over the oil supply hole 70, the axle case 40b is provided with a separating rib 86 that is configured to divide or separate the oil flowing along the first rib 78, into a part of the oil and another part of the oil in an intermediate portion of the first rib 78 and to cause the part of the oil to join with the another apart of the oil in a position located right above the oil supply hole 70, so as to guide the oil into the oil supply hole 70. The separating rib 86 is adjacent to the first rib 78 in the horizontal direction and is located on the upper side of the oil supply hole 70, and is as well as the first and second ribs 78, 79 is formed integrally with the axle case 40b in a casting process.

The separating rib 86 is a generally cuboid-shaped rib that protrudes from the wall surface 56a of the partition wall 56 in the above-described perpendicular direction such that the separating rib 86 has a side surface which is elongated in the vertical direction and which is in contact with the wall surface 78a of the first rib 78. The separating rib 86 has a height smaller than a height of the first rib 78, wherein the height corresponds to a distance from the wall surface 56a of the partition wall 56 in the perpendicular direction. The separating rib 86 has an upper end surface 86a that intersects with the wall surface 78a of the first rib 78 in a position corresponding to the intermediate portion of the first path L1 in which the oil flowing along the first path L1 is to be separated into the part of the oil and the another part of the oil. The upper end surface 86a of the separating rib 86 is inclined upwardly in the rightward direction as seen in the drawing sheet of FIG. 3, i.e., in a direction which is parallel to the horizontal direction and which is away from the wall surface 78a of the first rib 78. Owing to provision of the separating rib 86, the oil flowing downwardly along the wall surface 78a of the first rib 78 is caused to collide with an upper end surface 86a of the separating rib 86 whereby the flow velocity of the oil is reduced. Further, the oil flowing downwardly along the first rib 78 is separated into a part of the oil and another part of the oil, such that the part of the oil flows downwardly along a second surface 86c of the separating rib 86. The second surface 86c is another side surface opposite to the above-described side surface that is in contact with the wall surface 78a of the first rib 78. Further, the above-described part of the oil is caused to join with the above-described another part of the oil in the position located right above the oil supply hole 70. A direction of flow of the above-described part of the oil and a direction of the above-describe another part of the oil are changed when the two parts of the oil join with each other, and the mutually joined two parts of the oil are introduced into the oil supply hole 70.

Figure 5:
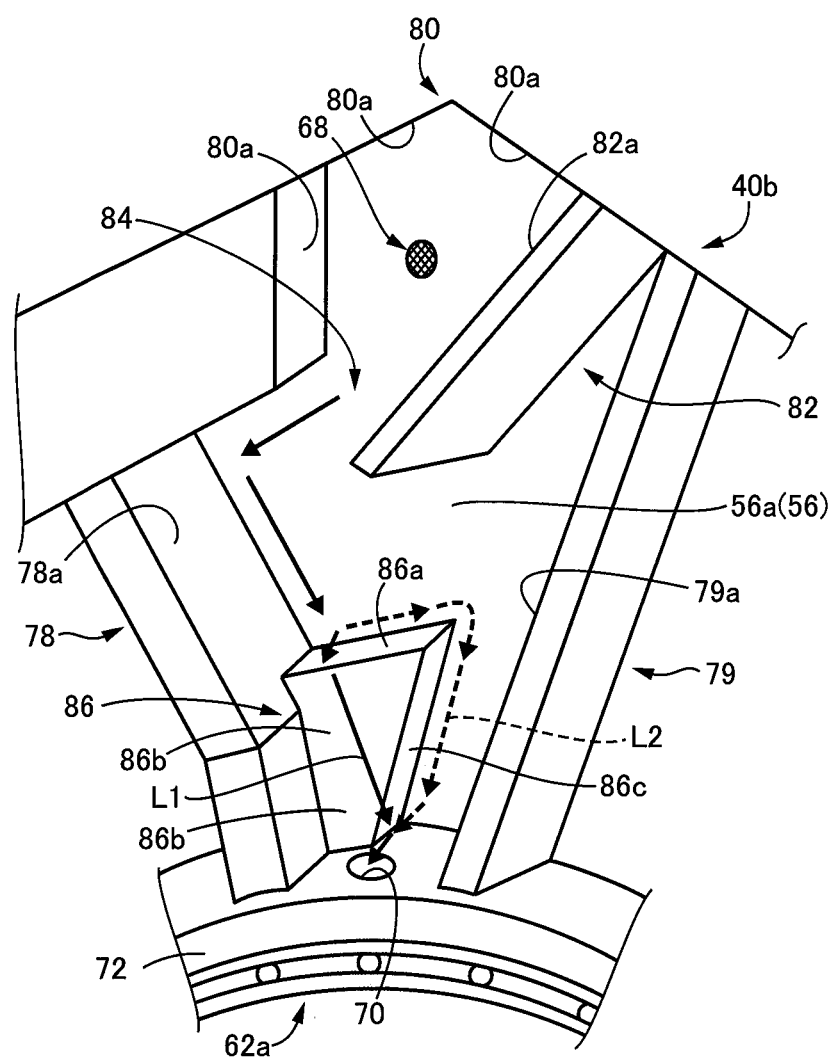
FIG. 5 is a view conceptually showing flows of the oil which is moved downward through a clearance between a step and a rib that are shown also in FIG. 4, and which s eventually moved into the oil supply hole.

FIG. 5 is a view conceptually showing the flows of the oil which is moved downwardly through the clearance 84 between the step 80 and the block rib 82 that are shown also in FIG. 4, and which is eventually introduced into the oil supply hole 70. It is noted that the view of FIG. 5 is a perspective view showing shapes and configurations shown in FIG. 3, in a simplified manner, and that the shown shapes and configurations do not precisely coincide with those shown in FIG. 3.

The oil, which has been caused to collide with the oil collision portion 68 located above the oil supply hole 70, is caused to collide also with the wall surface 80a of the step 80 and the wall surface 82a of the block rib 82 in a repeated manner. Then, after the flow velocity of the oil has been reduced as a result of the repeated collision of the oil, the oil is moved downwardly through the clearance 84 defined between the step 80 and the block rib 82, as shown in FIG. 5. After having been moved downwardly of the clearance 84, the oil is moved toward the first rib 78. When reaching an upper portion of the wall surface 78a of the first rib 78, the oil is moved from a diagonally upper side of the oil supply hole 70 along the wall surface 78a of the first rib 78 and is then caused to collide with the upper end surface 86a of the separating rib 86. With the oil being caused to collide also with the upper end surface 86a, the flow velocity of the oil is further reduced.

As shown in FIG. 5, the upper end surface 86a of the separating rib 86 is inclined upwardly in a direction away from the first rib 79 toward the second rib 79. Further, the separating rib 86 has a first surface 86b and the above-described second surface 86c. The first surface 86b is parallel to the wall surface 56a of the partition wall 56. The second surface 86c is opposed to the wall surface 79a of the second rib 79, and is opposite to the above-described side surface that is in contact with the wall surface 78a of the first rib 78. Owing to provision of the separating rib 86, the oil moved along the wall surface 78a of the first rib 78 is separated into two parts that are to flow along two paths consisting of first and second paths L1, L2. Specifically, the first path L1 is configured to guide the oil to flow downwardly from the diagonally upper side of the oil supply hole 70, along the wall surface 78a of the first rib 78, toward the oil supply hole 70. The second path L2 is configured to separate the oil flowing along the first path L1, into the above-described part of the oil and the above-described another part of the oil, in the intermediate portion of the first path L1 (in which the oil is caused to collide with the upper end surface 86a of the separating rib 86), and to guide the above-described part of the oil to flow downwardly along the second surface 86c toward the oil supply hole 70.

In FIG. 5, arrows represented by solid lines indicate flows of the oil guided by the first path L1. The first path L1 is configured to guide the oil to flow downwardly from the diagonally upper side of the oil supply hole 70, along the wall surface 78a of the first rib 78, and is configured, after the oil is caused to collide with the upper end surface 86a of the separating rib 86, to guide the above-described another part of the oil toward the first surface 86b of the separating rib 86 such that the another part of the oil flows downwardly along the first surface 86b toward the oil supply hole 70. The first path L1 is constituted mainly by the first rib 78. It is noted that the first rib 78 corresponds to "first guide portion (that defines a first path)" recited in the appended claims.

Further, in FIG. 5, arrows represented by broken lines indicate flows of the oil guided by the second path L2. The second path L2 is configured, after the oil is caused to collide with the upper end surface 86a of the separating rib 86, to guide the above-described part of the oil toward the second surface 86c of the separating rib 86 such that the part of the oil is moved up along the upper end surface 86a and then flows downwardly along the second surface 86c toward the oil supply hole 70. The second path L2 is constituted by the separating rib 86. It is noted that the second rib 86 corresponds to "second guide portion (that defines a second path)" recited in the appended claims.

When the flow velocity of the oil is low upon its collision with the upper end surface 86a of the separating rib 86, the oil is moved toward the first surface 86b, without being moved up over the upper end surface 86a toward the second surface 86c. That is, when the flow velocity of the oil is low, the oil is introduced into the oil supply hole 70 via the first path L1.

On the other hand, when the flow velocity of the oil flowing along the first path L1 becomes high, the oil could arrive in a position deviated from the oil supply hole 70. Specifically, as indicated by solid arrows in FIG. 5, the flow of the oil could be offset onto right side (as seen in the drawing sheet) of the oil supply hole 70, so that the oil is likely to pass over the oil supply hole 70 without the oil flowing into the oil supply hole 70. However, in the present embodiment, when the flow velocity of the oil is high, a part of the oil caused to collide with the upper end surface 86a is moved up over the upper end surface 86a and is then guided to the oil supply hole 70 via the second surface 86c, namely, is moved along the second path L2 that may referred also to as "bypass path" bypassing a part of the first path L1. Thus, when the flow velocity becomes high, the oil is flow along the first and second paths L1, L2.

Then, as shown in FIG. 5, the part of the oil flowing along the second path L2 is caused to join with the another part of the oil flowing along the first path L1 in the position right above the oil supply hole 70, whereby a direction of the flow of another part of the oil along the first path L1 is changed and eventually the oil is guided into the oil supply hole 70.

Thus, when the flow velocity of the oil is high, the flow of the oil is divided into the flow along the first path L1 and the flow along the second path L2, and then the flow along the first path L1 and the flow along the second path L2 are caused to join with each other and collide with each other in the position right above the oil supply hole 70, whereby each of the direction of the flow along the first path L1 and the direction of the flow along the second path L2 is changed to a direction toward the oil supply hole 70, so that the oil is introduced into the oil supply hole 70. Therefore, with the oil discharged from the pipe 66 efficiently flowing into the oil supply hole 70, a sufficient amount of the oil is supplied to the bearing 62a rotatably supporting the differential device 20 whereby insufficiency of lubrication of the bearing 62a is resolved.

The separating rib 86 has a shape and a size and is disposed in a position, wherein the shape, size and position are predetermined through experimentation or determined by an appropriate design theory, such that, when the flow velocity of the oil becomes high, the flowing oil is separated, on the upper end surface 86a, into the part of the oil that is to flow along the second path L2 and the another part of the oil that is to flow along the first path L1, and the part of the oil flowing along the second path L2 and the another part of the oil flowing along the first path L1 are caused to join with each other in the position right above the oil supply hole 70, and are introduced into the oil supply hole 70. For example, an increase of an area of the upper end surface 86a of the separating rib 86 facilitates the reduction of the flow velocity of the oil. Further, the flow amount or rate of the part of the oil flowing along the second path L2 can be adjusted by adjusting a degree of inclination of the upper end surface 86a. The direction of the flow of the part of the oil along the second path L2 can be adjusted as needed by adjusting, for example, a shape of the second surface 86c of the separating rib 86. Thus, the part of the oil flowing along the second path L2 and the another part of the oil flowing along the first path L1 can be caused to join with each other in the position right above the oil supply hole 70, and can be introduced into the oil supply hole 70.

As described above, in the present embodiment, the oil flowing along the first path L1 is separated, by the separating rib 86 defining the second path L2, into the part of the oil and the another part of the oil in the intermediate portion of the first path L1 whereby the flow velocity of the oil is reduced. Further, the part of the oil flowing along the second path L2 and the another part of the oil flowing the first path L1 are caused to join with each other in the position located right above the oil supply hole 70, so that the two parts of the oil are caused to collide with each other, whereby each of directions of flows of the two parts of the oil is changed to a direction toward the oil supply hole 70. Thus, the oil into which the two parts of the oil have been integrated is introduced into the oil supply hole 70. Owing to this arrangement, even when the flow velocity is high, it is possible to reduce the oil flowing to a position deviated from the oil supply hole 70, thereby making it possible to restrain an amount of the oil introduced into the oil supply hole 70, from being smaller than a required amount.

In the present embodiment, the differential-interlocking oil pump P1 is to be driven by the rotary member in the form of the differential ring gear 38, and the oil discharged from the differential-interlocking oil pump P1 is supplied toward the oil supply hole 70 from the diagonally upper side of the oil supply hole 70, so that the flow velocity of the oil discharged from the differential-interlocking oil pump P1 is increased in proportion with increase of the running speed of the vehicle 8. However, owing to provision of the separating rib 86, the oil can be introduced efficiently into the oil supply hole 70 even when the flow velocity of the oil discharged from the differential-interlocking oil pump P1 is increased.

While the preferred embodiment of this invention has been described in detail by reference to the drawings, it is to be understood that the invention may be otherwise embodied.

For example, in the above-described embodiment, the drive-force transmitting apparatus 10 is a drive-force transmitting apparatus of FF type in which the various gears and rotary shafts are disposed on the four axes CL1-CL4. However, the construction of the drive-force transmitting apparatus according to the present invention is not limited to the detail in the above-described embodiment. The present invention is applicable to any drive-force transmitting apparatus for a vehicle, as long as the drive-force transmitting apparatus has a construction in which the oil discharged from the pipe 66 is moved from the diagonally upper side of the oil supply hole so as to be introduced into the oil supply hole.

In the above-described embodiment, the differential-interlocking oil pump P1 is to be driven by rotation of the differential ring gear 38 of the differential device 20. However, this detail is not essential. For example, the differential-interlocking oil pump P1 may be driven by the counter gear 28 or any other rotary member that is to be rotated together with the drive wheels 14. Further, the mechanical oil pump, which is recited in the appended claims, does not have to be driven necessarily by rotation of a rotary member that is to be rotated together with the drive wheels 14, but may be constituted by the engine-interlocking oil pump P2 in place of the differential-interlocking oil pump P1, for example, such that the oil discharged from the engine-interlocking oil pump P2 is delivered by the pipe 66 and is discharged from the pipe 66. That is, the mechanical oil pump, which is recited in the appended claims, may be constituted by any mechanical oil pump that could be rotated at a high rotational speed depending on a running state of the vehicle.

It is to be understood that the embodiment described above is given for illustrative purpose only, and that the present invention may be embodied with various modifications and improvements which may occur to those skilled in the art.

NOMENCLATURE OF ELEMENTS

10: vehicle drive-force transmitting apparatus
14: drive wheels
38: differential ring gear (rotary member to be rotated together with drive wheels)
40: casing
40b: axle case
62a: bearing (lubrication-required element)
70: oil supply hole
72: bearing support portion (cylindrical tubular member)
78: first rib (first guide portion)
86: separating rib (second guide portion)
L1: first path
L2: second path
P1: differential-interlocking oil pump (mechanical oil pump)

What is claimed is:

1. A drive-force transmitting apparatus for a vehicle, the drive-force transmitting apparatus comprising:
a casing provided with an oil supply hole through which an oil is to be supplied to a lubrication-required element,
wherein the casing is provided with a first guide portion and a second guide portion,
wherein the first guide portion defines a first path that is configured to guide the oil to flow from an upper side of the oil supply hole, toward the oil supply hole, and
wherein the second guide portion defines a second path that is configured to separate the oil flowing along the first path, into a part of the oil and another part of the oil at a portion proximate to a middle portion of the first path in a downward direction of the drive-force transmitting apparatus, and to cause the part of the oil to join with the another part the oil in a position located above the upper side of the oil supply hole,
wherein the first guide portion is constituted by at least a first rib which extends from an inside wall surface of the casing, while the second guide portion is constituted by at least a separating rib which extends from the inside wall surface of the casing,
wherein the first rib is located on an upper side of the oil supply hole and on one of opposite sides, in a horizontal direction of the drive-force transmitting apparatus, of the oil supply hole,
wherein the first rib has a guide surface which faces generally toward the other of the opposite sides of the oil supply hole and which is inclined toward the other of the opposite sides of the oil supply hole in the downward direction of the drive-force transmitting apparatus, such that the oil is to be guided to flow along the guide surface from the upper side of the oil supply hole toward the oil supply hole, and
wherein the separating rib is adjacent to the first rib in the horizontal direction and is located on the upper side of the oil supply hole, the separating rib having an upper end surface that intersects with the guide surface of the first rib in a position corresponding to the middle portion of the first path in which the oil flowing along the first path is to be separated into the part of the oil and the another part of the oil.

2. The drive-force transmitting apparatus according to claim 1,
further comprising:
a rotary member that is to be rotated together with drive wheels of the vehicle; and
a mechanical oil pump that is to be driven by the rotary member to discharge the oil that is to be guided to flow from the upper side of the oil supply hole toward the oil supply hole.

3. The drive-force transmitting apparatus according to claim 1,
wherein the lubrication-required element is a bearing fitted in an inner peripheral portion of a cylindrical tubular member that is provided with the oil supply hole.

4. The drive-force transmitting apparatus according to claim 1,
wherein the upper end surface of the separating rib is inclined upwardly in a direction which is parallel to the horizontal direction and which is away from the guide surface of the first rib.

5. The drive-force transmitting apparatus according to claim 2,
wherein the mechanical oil pump is configured to pump out the oil stored in an oil storage that is constituted by a lower portion within the casing,
wherein the drive-force transmitting apparatus further comprises a rotary member that is at least partially immersed in the oil stored in the oil storage, and
wherein the lubrication-required element is a bearing by which the rotary member is rotatably supported.

6. A drive-force transmitting apparatus for a vehicle, the drive-force transmitting apparatus comprising:
a casing provided with an oil supply hole through which an oil is to be supplied to a lubrication-required element,
wherein the casing is provided with a first guide portion and a second guide portion,
wherein the first guide portion defines a first path that is configured to guide the oil to flow from an upper side of the oil supply hole, toward the oil supply hole,
wherein the second guide portion defines a second path that is configured to separate the oil flowing along the first path, into a part of the oil and another part of the oil at a portion proximate to a middle portion of the first path in a downward direction of the drive-force transmitting apparatus, and to cause the part of the oil to join with the another part the oil in a position located above the upper side of the oil supply hole, and
wherein the lubrication-required element is a bearing fitted in an inner peripheral portion of a cylindrical tubular member that is provided with the oil supply hole.

7. The drive-force transmitting apparatus according to claim 6, further Comprising:
a rotary member that is to be rotated together with drive wheels of the vehicle; and
a mechanical oil pump that is to be driven by the rotary member to discharge the oil that is to be guided to flow from the upper side of the oil supply hole toward the oil supply hole.

8. The drive-force transmitting apparatus according to claim 7,
wherein the mechanical oil pump is configured to pump out the oil stored in an oil storage that is constituted by a lower portion within the casing,
wherein the drive-force transmitting apparatus further comprises a rotary member that is at least partially immersed in the oil stored in the oil storage, and
wherein the lubrication-required element is a bearing by which the rotary member is rotatably supported.

* * * * *